United States Patent
Esenwein et al.

(10) Patent No.: US 10,888,808 B2
(45) Date of Patent: Jan. 12, 2021

(54) FILTER SUPPORT FOR A HANDHELD POWER TOOL

(71) Applicant: Robert Bosch GmbH, Stuttgart (DE)

(72) Inventors: Florian Esenwein, Leinfelden-Echterdingen (DE); Peter Stierle, Pliezhausen (DE); Manfred Lutz, Filderstadt (DE); Thomas Schomisch, Filderstadt (DE)

(73) Assignee: Robert Bosch GmbH, Stuttgart (DE)

(*) Notice: Subject to any disclaimer, the term of this patent is extended or adjusted under 35 U.S.C. 154(b) by 267 days.

(21) Appl. No.: 15/775,951

(22) PCT Filed: Oct. 4, 2016

(86) PCT No.: PCT/EP2016/073586
§ 371 (c)(1),
(2) Date: May 14, 2018

(87) PCT Pub. No.: WO2017/102125
PCT Pub. Date: Jun. 22, 2017

(65) Prior Publication Data
US 2018/0326337 A1  Nov. 15, 2018

(30) Foreign Application Priority Data

Dec. 17, 2015 (DE) .................. 10 2015 225 802
Jul. 25, 2016 (DE) .................. 10 2016 213 617

(51) Int. Cl.
*B25F 5/02* (2006.01)
*B01D 46/00* (2006.01)
(Continued)

(52) U.S. Cl.
CPC .......... *B01D 46/0005* (2013.01); *B25F 5/008* (2013.01); *B25F 5/02* (2013.01); *B24B 23/028* (2013.01)

(58) Field of Classification Search
CPC .......... B01D 46/0005; B25F 5/00; B25F 5/02; B24B 23/028
(Continued)

(56) References Cited

U.S. PATENT DOCUMENTS

2009/0095249 A1  4/2009  Panasik et al.
2014/0260994 A1*  9/2014  Grider ................ B01D 46/0086
                                                    96/399
2015/0328573 A1* 11/2015  Hiller ....................... B25F 5/008
                                                    451/359

FOREIGN PATENT DOCUMENTS

CH        336121       2/1959
DE  10 2008 009 277 A1  8/2009
(Continued)

OTHER PUBLICATIONS

Merriam-Webster, hinge, 2020, Merriam-Webster, p. 1 (Year: 2020).*
(Continued)

*Primary Examiner* — Minh Chau T Pham
(74) *Attorney, Agent, or Firm* — Maginot, Moore & Beck LLP

(57) ABSTRACT

A filter support for a handheld power tool includes at least one filter support element, a first fastening element, and a second fastening element. The filter support element includes at least one receiving opening configured to receive a filter element. The filter elements of the filter support are preferably associated with air inlet openings of the handheld power tool and are configured to filter dust particles and/or material particles from a cooling air flow. The filter support can be fastened to a handheld power tool via the first and second fastening elements. The first and the second fastening elements of the filter support can be connected to each other. Advantageously, no fastening elements are provided on the handheld power tool.

20 Claims, 11 Drawing Sheets

(51) Int. Cl.
*B25F 5/00* (2006.01)
*B24B 23/02* (2006.01)

(58) Field of Classification Search
USPC ..... 55/385.1; 173/162.1, 168, 171; 451/357,
451/359, 344, 456, 488
See application file for complete search history.

(56) References Cited

FOREIGN PATENT DOCUMENTS

| | | |
|---|---|---|
| EP | 2 944 423 A1 | 11/2015 |
| JP | 58-49066 A | 3/1983 |
| JP | 2002-283255 A | 10/2002 |
| JP | 2002283255 A * | 10/2002 ............. B25F 5/008 |
| JP | 2010-36260 A | 2/2010 |
| WO | 2015/066759 A1 | 5/2015 |

OTHER PUBLICATIONS

International Search Report corresponding to PCT Application No. PCT/EP2016/073586, dated Jan. 20, 2017 (German and English language document) (7 pages).

* cited by examiner

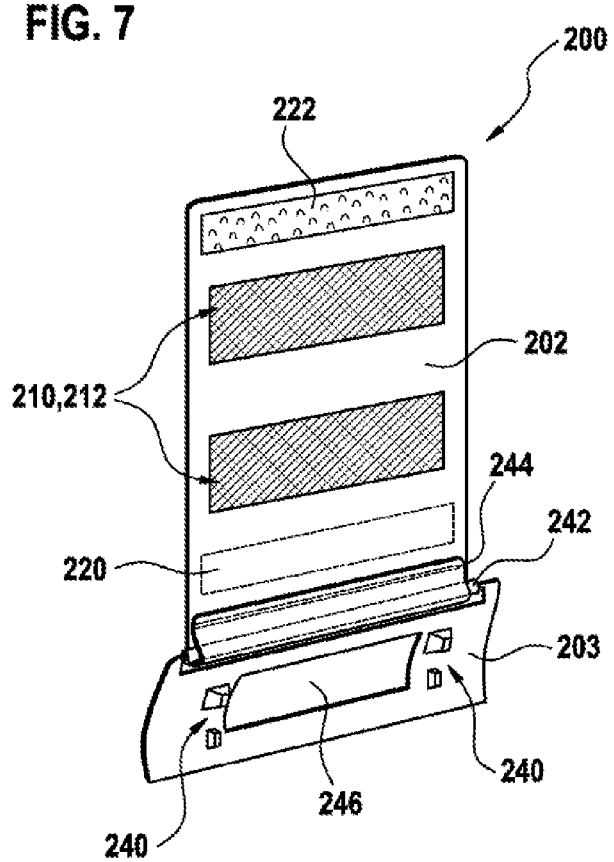

FILTER SUPPORT FOR A HANDHELD POWER TOOL

This application is a 35 U.S.C. § 371 National Stage Application of PCT/EP2016/073586, filed on Oct. 4, 2016, which claims the benefit of priority to Serial No. DE 10 2015 225 802.5, filed on Dec. 17, 2015 in Germany and Serial No. DE 10 2016 213 617.8, filed on Jul. 25, 2016 in Germany, the disclosures of which are incorporated herein by reference in their entirety.

BACKGROUND

The disclosure relates to a filter carrier for a hand-held power tool.

In DE 2008 009 277 A1 is an electric hand-held power appliance, having a housing body that accommodates the electric-motor drive components and in which air inlet openings are also provided for a cooling air flow applied to the electric-motor drive components. Furthermore, the appliance is realized such that a filter means is provided, in the region of the air inlet openings, by means of which, in particular, magnetization dust can be kept away from the electric-motor drive components.

SUMMARY

There ensues from the prior art the object of providing a hand-held power tool having a filter carrier, the filter carrier being easily separable from the hand-held power tool.

The disclosure relates to a filter carrier for a hand-held power tool having at least one filter carrier element, wherein the filter carrier element has at least one receiving opening that is designed to receive at least one filter element. The filter carrier may be realized such that it can be separably fastened to the hand-held power tool. The hand-held power tool may exemplarily be realized as an angle grinder, a drill, a hammer drill, an orbital sander, a router, a power sander, etc. The hand-held power tool has a housing. A motor, in particular an electric motor, may be accommodated in the housing. Furthermore, the housing of a hand-held power tool may have at least one air inlet opening, which is designed to realize an access for cooling air into the inner components of the hand-held power tool. The filter element of the filter carrier is arranged in such a manner in the receiving opening of the filter carrier that the filter element prevents ingress of material particles and dust into the housing of the hand-held power tool. The filter element of the filter carrier may be made of a substantially dust-tight material. The filter element may be made, in particular, of a woven plastic fabric or woven metal fabric, or plastic mesh or metal mesh. In particular, the filter element may be connected to the filter carrier element of the filter carrier by injection molding, adhesive bonding, clipping, insertion, sewing-in, hot-stamping or ultrasonic welding. The filter carrier element of the filter carrier may advantageously be made of a low-flexibility material, in particular a dimensionally or flexurally stable plastic. Alternatively, the filter carrier may also be made of a high-flexibility material. The filter carrier may be of a single-piece or multi-piece design, in particular depending on the geometry of the hand-held power tool.

Furthermore, the filter carrier according to the disclosure comprises at least one first fastening element and at least one second fastening element, for separably fastening the filter carrier to respectively corresponding securing elements of a hand-held power tool by positive and/or non-positive engagement. The first fastening element and the second fastening element of the filter carrier are arranged at opposite end regions of the filter carrier, in such a manner that the first fastening element can be connected to the second fastening element. End regions of the filter carrier are to be understood to mean, in particular, the lateral edges of the filter carrier or the immediate vicinity of the lateral edges of the filter carrier. In particular, the first and the second fastening element of the filter carrier, in the non-fastened state, are arranged at opposite end regions or lateral edges.

In the following, the filter carrier is described in two states, a state of having been fastened to a hand-held power tool and a non-fastened state. In particular, in the fastened state, the first and the second fastening element are separably connected to each other, and in the non-fastened state the first and the second fastening element of the filter carrier are spaced apart from each other. The connection between the first fastening element of the filter carrier and the second fastening element of the filter carrier may be effected, in particular, by positive and/or non-positive engagement, in particular by means of a latching connection. The inner contour of the filter carrier that faces toward the hand-held power tool may advantageously be closely matched to the outer contour of the housing of the hand-held power tool. As a result, when the filter carrier is in the fastened state, a positive engagement, in particular positive and non-positive engagement, of the filter carrier with the hand-held power tool is produced. The first and the second fastening element, in particular realized as latching element, of the filter carrier may be molded on the filter carrier and thus realized so as to be integral with the filter carrier element.

The filter carrier may be designed, in the fastened state, to encompass the circumferential surface of a hand-held power tool at least partially in the longitudinal direction, and to encompass the circumferential surface of the hand-held power tool at least partially, in particular completely, in the circumferential direction. To at least partially encompass the circumferential surface of the hand-held power tool in the circumferential direction, is to be understood to mean, in particular, encompassing an angular range of from 180° to 360°, advantageously 270° to 360°. In particular completely, is to be understood to mean an angular range of 360°. The angular range that is encompassed by the filter carrier is not intended in this case to include the overlapping of the first and the second fastening element. Circumferential surface of a hand-held power tool in this case is to be understood to mean, in particular, the circumferential surface of a housing of a hand-held power tool. The longitudinal direction of the hand-held power tool runs substantially coaxially in relation to the drive train of the hand-held power tool. In the fastened state, the longitudinal direction of the filter carrier corresponds substantially to the longitudinal alignment of the hand-held power tool. The longitudinal direction of the filter carrier in the fastened state corresponds to the longitudinal direction of the filter carrier in the non-fastened state. When the filter carrier is in the fastened state, the opposite end regions, at which the first and the second fastening element are arranged, can advantageously impinge on each other.

The first fastening element and the second fastening element of the filter carrier may be arranged substantially along or transversely in relation to the longitudinal direction of the filter carrier. In particular, the opposite end regions of the filter carrier, in the fastened state, may be arranged substantially along or transversely in relation to the longitudinal direction of the filter carrier. If the filter carrier completely encompasses the circumferential surface of the hand-held power tool in the circumferential direction, the fastening elements may advantageously be realized substantially along the longitudinal direction of the hand-held power tool. If the filter carrier partially encompasses the circumferential surface of the hand-held power tool in the circumferential direction, the fastening elements may advantageously be realized substantially transversely in relation to the longitudinal direction of the hand-held power tool. The first and/or the second fastening element of the filter carrier may extend along the end region, at which they are arranged, by at least 25%, advantageously at least 50%, further advantageously by at least 75%, or in particular substantially completely.

The first and/or the second fastening element of the filter carrier may be realized so as to be continuous, segmented or partial. In particular, the extent of the first fastening element of the filter carrier corresponds to the extent of the second fastening element of the filter carrier.

The filter carrier may have a further filter carrier element, which is arranged at an angle of 45°-90° to the longitudinal alignment of the hand-held power tool. In particular, the angle may also be 75°-90°, and advantageously the further filter carrier element is arranged substantially perpendicularly in relation to the the longitudinal alignment of the hand-held power tool. In particular, the further filter element covers over the rear end of a hand-held power tool at which, for example, a bushing for receiving a mains power cable may be provided. This has the advantage that, besides the air inlet openings of the hand-held power tool along the circumferential surface of the hand-held power tool, there are also air inlet opening at the rear end of the hand-held power tool that can be covered with the filter elements of the filter carrier. The additional filter element may be realized, in particular, so as to be integral with a filter carrier element arranged on the circumferential surface. It is also conceivable, however, that the further filter carrier element covers another surface of the housing of the hand-held power tool.

The at least one filter carrier element may be made of a low-flexibility material. In particular, the filter carrier element is made of a dimensionally and/or flexurally stable material.

The filter carrier may comprise two filter carrier elements, which are realized as filter-carrier half-shells.

The filter carrier may have a joint, in particular a hinge joint or a rotary joint, which is arranged between the two filter-carrier half-shells. In particular, the two filter-carrier half-shells are connected to each other via the joint. When the filter carrier is in the fastened state, the joint of the filter carrier may be arranged, for example, opposite the first and the second fastening element of the filter carrier. The joint of the filter carrier constitutes a rotary axis. The joint of the filter carrier is advantageously provided to set an opening angle, between the two housing half-shells of the filter carrier, in a range of from 0°, which corresponds to the opening angle when the filter carrier is in the fastened state, and a maximum opening angle. A suitable maximum opening angle may be in a range of from 10° to 270°. The joint of the filter carrier may advantageously be realized in such a manner that the maximum opening angle when the filter carrier is in the non-fastened state is at least 180°. If the opening angle is 0°, for example, the first and the second fastening element of the filter carrier can be connected to each other. It is also conceivable that a connection of the first fastening element to the second fastening element of the filter carrier can be realized already from an opening angle of 15°. The filter carrier elements and/or the further filter carrier element and/or the joint may be realized integrally.

Owing to the large maximum opening angle, the filter carrier attachment can be fastened easily and conveniently to the hand-held power tool.

The two filter-carrier half-shells may exemplarily be such that they can be separably connected to each other by means of two first fastening elements and two second fastening elements. For ease of applying the filter carrier to the hand-held power tool, the first pair of fastening elements is advantageously located opposite the second pair of fastening elements. A pair of fastening elements comprises, in particular, a first and a second fastening element that can be separably connected to each other. An additional pair of fastening elements may thus replace the joint.

The first fastening element and the second fastening element may preferably be realized as mutually corresponding latching elements. A latching connection may advantageously be realized for connecting the fastening elements by non-positive and/or positive engagement.

The at least one receiving openings of the filter carrier element may have at least one additional securing element, which is designed to provide axial and/or rotational securing of the filter carrier on the hand-held power tool. In particular, the securing element of the filter carrier may be realized such that it can be separably connected to the air inlet openings of the hand-held power tool. The securing element of the filter carrier may advantageously be realized such that it can be separably connected, by means of a positive engagement, to structural elements of the air inlet openings of the hand-held power tool. Structural elements of the air inlet openings of the hand-held power tool may serve, in particular, as lateral walls of the air inlet openings.

Alternatively, the filter carrier element may be made of a high-flexibility material. In particular, the filter carrier element may be realized so as to be deformable in such a manner that, in the fastened state, it fits closely against the housing of the hand-held power tool. In particular, the filter carrier may be realized as a band, or as an envelope encompassing the circumferential surface of a hand-held power tool. The filter carrier element of the filter carrier may advantageously be made of the material of the filter element. It is also conceivable for the filter carrier, the at least one filter element and the first and the second fastening element of the filter carrier to be realized integrally, and made of one material. Of one material is to be understood to mean, in particular, that the corresponding component parts of the filter carrier are made from the same material.

The first fastening element and the second fastening element of the filter carrier may be arranged on opposite lateral surface of the filter carrier. The filter carrier has substantially two lateral surfaces; an inner lateral surface of the filter carrier and an outer lateral surface of the filter carrier, the inner lateral surface impinging on the housing of the hand-held power tool when the filter carrier is in the fastened state. Advantageously, the first and the second fastening element of the filter carrier may be arranged at opposite end regions and on opposite lateral surfaces of the filter carrier.

The first fastening element and the second fastening element of the filter carrier may have mutually corresponding hook-and-loop closure elements. The filter carrier, which in particular may be realized as a band or an envelope, may be realized such that it can be closed by means of a hook-and-loop connection and fastened to the hand-held power tool. The hook-and-loop closure elements may be realized, in particular, as hook elements or loop elements, for high-tensile and substantially dust-tight and/or air-tight fastening of the filter carrier to the hand-held power tool. The filter carrier element, the at least one filter element and the first and the second fastening element of the filter carrier are realized such that they can be connected to each other, for example by sewing or cementing, without losing the elasticity and flexibility of the filter carrier. The filter carrier may be realized as an envelope or a shell.

Furthermore, a lateral surface of the filter carrier element may be realized as the first fastening element, and the second lateral surface of the filter carrier element realized as the second fastening element. This enables the filter carrier to be fastened to differing sizes of circumferential surface of a hand-held power tool.

It is furthermore conceivable for the filter carrier to have an additional positive-engagement element. The additional positive-engagement element is provided, in particular, to connect the filter carrier by positive engagement to the hand-held power tool. Advantageously, the additional positive-engagement element is designed to prevent an axial displacement of the filter carrier along the longitudinal axis of the hand-held power tool and/or twisting of the filter carrier about the housing of the hand-held power tool.

Furthermore, the filter carrier may advantageously have a second filter carrier element, wherein the at least one additional positive-engagement element is arranged on the second filter carrier element. The second filter carrier element is made, in particular, from a dimensionally stable plastic. Particularly advantageously, the high-flexibility filter carrier element is connected by non-positive engagement to the hand-held power tool, and the dimensionally stable second filter carrier element is connected by positive engagement to the hand-held power tool.

The second filter carrier element may be connected to the first filter carrier element by means of a web, as a result of which, advantageously, the two filter carrier elements are captively connected to each other.

The disclosure additionally relates to a system composed of a hand-held power tool having a filter carrier according to the disclosure. The hand-held power tool may be realized, in particular, as a power drill, screwdriver, router, hammer drill, orbital sander and, advantageously, as an angle grinder. The hand-held power tool advantageously has at least one air inlet opening, which is designed to realize an inlet for a cooling air flow into the interior of a housing of the hand-held power tool. The cooling air flow is designed, in particular, to cool an electric motor and/or electronics and/or another internal component of the hand-held power tool that heats up.

BRIEF DESCRIPTION OF THE DRAWINGS

Further advantages are disclosed by the following description of the drawings. The drawings show exemplary embodiments of the disclosure. The drawing, the description and the claims contain numerous features in combination. Persons skilled in the art will expediently also consider the features individually and combine them to form further appropriate combinations.

FIG. 7: Perspective view of a further embodiment of a filter carrier.

DETAILED DESCRIPTION

Figure 1A:
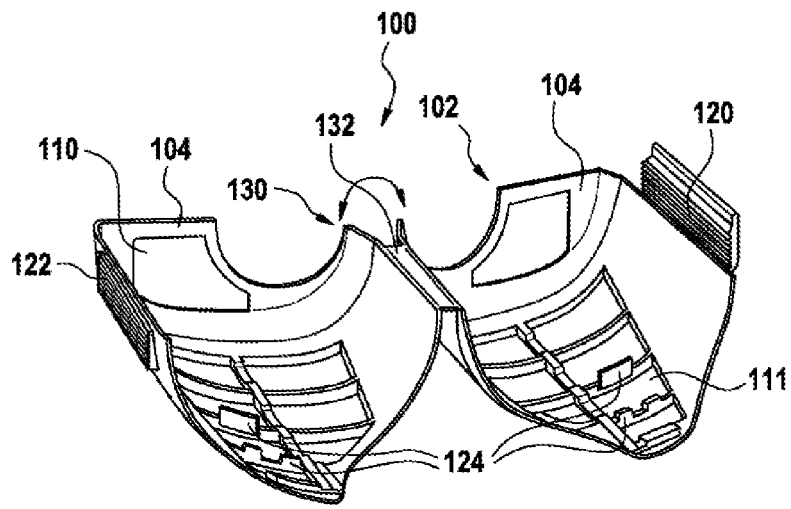
FIG. 1a: Perspective view of a filter carrier according to the disclosure.

Shown in FIG. 1a is a perspective view of a filter carrier 100 according to the disclosure in the non-fastened state. The filter carrier 100 comprises at least one filter carrier element 102, here two filter carrier elements 102, which are realized as filter-carrier housing half-shells 104. The filter carrier 100 is realized such that it can be separably fastened to a hand-held power tool 10 (shown in FIG. 1c). The filter carrier 100 has receiving openings 110,111, which are designed to receive filter elements 112 (represented in FIG. 1b). The filter carrier exemplarily has at least one receiving opening 111, which is arranged at least at an air inlet openings 20 on the outer circumferential surface of the hand-held power tool 10. Furthermore, the filter carrier 100 exemplarily has at least one receiving opening 110, which is arranged at least at an air inlet opening 11 at the rear end of the hand-held power tool 10. Here, the two filter-carrier housing half-shells 104 are movably connected to each other by means of a joint 130 in the form of a film hinge 132. Movably connected is to be understood to mean, in particular, that the joint 130 of the filter carrier 100 constitutes an axis about which the two filter-carrier housing half-shells 104 of the filter carrier 100 can move or rotate. Here, the opening angle between the two filter-carrier housing half-shells 104 is 180° in the non-fastened state. Arranged at two opposite end regions of the filter carrier 100 are a first fastening element 120 and a second fastening element 122. In this embodiment, the filter carrier can encompass the circumferential surface of the hand-held power tool substantially completely in the longitudinal direction. Here, in the fastened state, the first and the second fastening element 120,122 are realized substantially along the longitudinal direction. The first fastening element 120 of the filter carrier 100 is realized here as a latching element having latching lugs. The second fastening element 122 of the filter carrier 100 is realized here as a latching element, having a latching closure, that corresponds to the first fastening element 120. When the filter carrier 100 is in the state in which it is not fastened to the hand-held power tool 10, the first fastening element 120 of the filter carrier 100 is spatially separated from the second fastening element 122 of the filter carrier 100. In order to go from the state in which the filter carrier 100 is not fastened to the hand-held power tool to the fastened state, the two filter-carrier housing half-shells 104 are moved or rotated about the joint 130 in such a manner that a positive and/or non-positive engagement can be produced between the first and the second fastening element 120,122 of the filter carrier. The first fastening element 120 of the filter carrier 100 exemplarily has a multiplicity of latching lugs. The first latching lug of the second fastening element 120 of the filter carrier 100 may exemplarily be realized such that it can be connected to the second fastening element 122 of the filter carrier 100 already from an opening angle of approximately 15°. The positive and/or non-positive engagement of the first fastening element 120 with the second fastening element 122 of the filter carrier 100 may be further enhanced by a reduction of the opening angle to 0°. If the opening angle is 0°, the two end regions of the filter carrier 100, at which the first and the second fastening element 120,122 of the filter carrier are arranged, impinge on each other. In particular, the connection of the fastening element 120,122 of the filter carrier 100 is effected automatically by the joint 130. The filter carrier 100 may exemplarily have at least one additional securing element 124, which in particular may be arranged in the region of the receiving openings 111 of the filter carrier 100. The securing element 124 of the filter carrier 100 may exemplarily be realized as a lug or protuberance that extends, from the lateral surface of the filter carrier 100 that faces toward the hand-held tool, in the direction of the hand-held power tool 10. The securing element 124 of the filter carrier 100 is provided for additional axial and/or rotational securing of the filter carrier 100 when in the state of having been fastened to the hand-held power tool 10. The securing element 124 of the filter carrier 100 may be realized such that it can be separably connected by positive and/or non-positive engagement to the air inlet openings 20 on the outer circumferential surface of the housing 12 of the hand-held power tool 10. In particular, the securing element 124 of the filter carrier, in the fastened state, may substantially completely fill an air inlet opening 20 of the hand-held power tool 10. Furthermore, the securing element 124 of the filter carrier 100 in the fastened state may be arranged in such a manner that at least one lateral edge of an air inlet opening 20 of the hand-held power tool 10 is impinged on by positive and/or non-positive engagement, in particular 3 lateral edges.

The first fastening element 120 of the filter carrier 100 exemplarily has a multiplicity of latching lugs. The first latching lug of the second fastening element 120 of the filter carrier 100 may exemplarily be realized such that it can be connected to the second fastening element 122 of the filter carrier 100 already from an opening angle of approximately 15°. The positive and/or non-positive engagement of the first fastening element 120 with the second fastening element 122 of the filter carrier 100 may be further enhanced by a reduction of the opening angle to 0°. If the opening angle is 0°, the two end regions of the filter carrier 100, at which the first and the second fastening element 120,122 of the filter carrier are arranged, impinge on each other. In particular, the connection of the fastening element 120,122 of the filter carrier 100 is effected automatically by the joint 130. The filter carrier 100 may exemplarily have at least one additional securing element 124, which in particular may be arranged in the region of the receiving openings 111 of the filter carrier 100. The securing element 124 of the filter carrier 100 may exemplarily be realized as a lug or protuberance that extends, from the lateral surface of the filter carrier 100 that faces toward the hand-held tool, in the direction of the hand-held power tool 10. The securing element 124 of the filter carrier 100 is provided for additional axial and/or rotational securing of the filter carrier 100 when in the state of having been fastened to the hand-held power tool 10. The securing element 124 of the filter carrier 100 may be realized such that it can be separably connected by positive and/or non-positive engagement to the air inlet openings 20 on the outer circumferential surface of the housing 12 of the hand-held power tool 10. In particular, the securing element 124 of the filter carrier, in the fastened state, may substantially completely fill an air inlet opening 20 of the hand-held power tool 10. Furthermore, the securing element 124 of the filter carrier 100 in the fastened state may be arranged in such a manner that at least one lateral edge of an air inlet opening 20 of the hand-held power tool 10 is impinged on by positive and/or non-positive engagement, in particular 3 lateral edges.

Figure 1B:
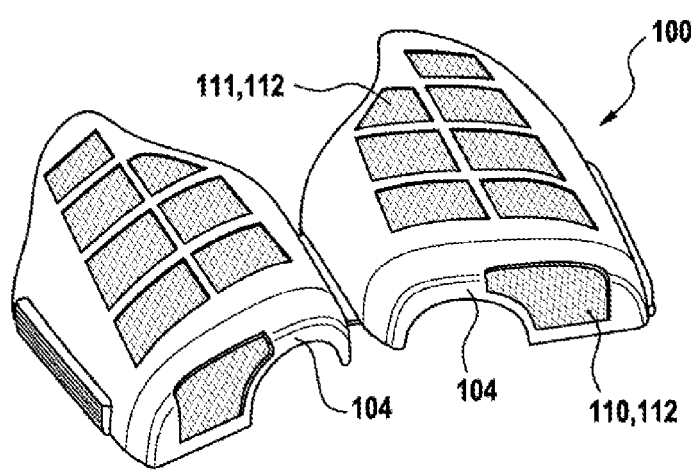
FIG. 1b: Perspective view of a filter carrier according to the disclosure.

Shown in FIG. 1b is a perspective view of the filter carrier 100, at least one filter element 112 being arranged in the receiving openings 110,111.

Figure 1C:
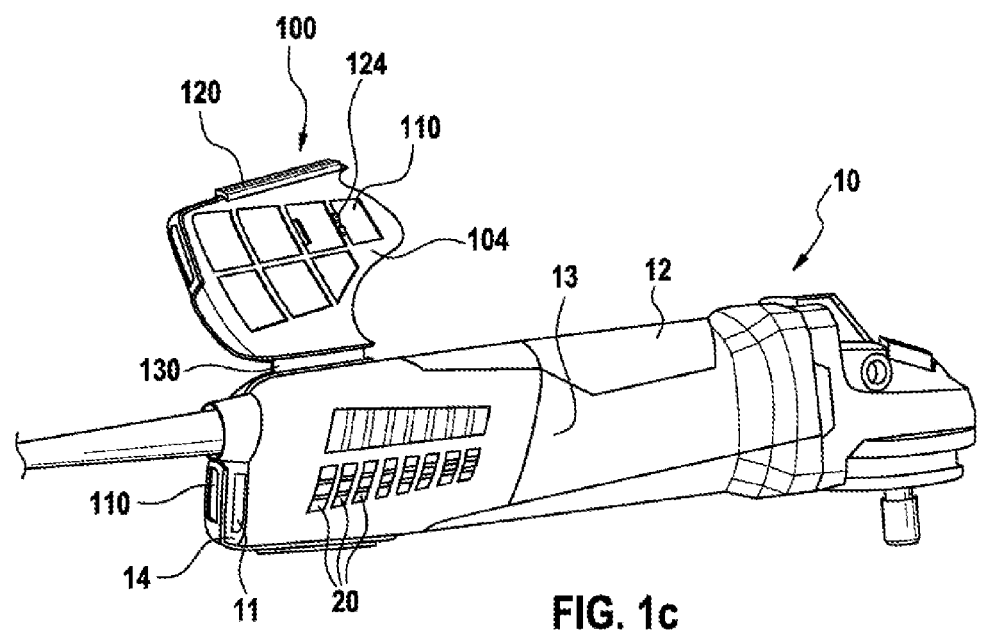
FIG. 1c: Perspective view of a hand-held power tool having a filter carrier in the non-fastened state.

Shown in FIG. 1c is a perspective view of a hand-held power tool 10, in particular an angle grinder, having a filter carrier 100 in the non-fastened state. The hand-held power tool has a housing 12 having an outer circumferential surface 13. Arranged on the outer circumferential surface 13 of the hand-held power tool 10 are air inlet openings 20, which are designed as an access for a cooling air flow into the interior of the housing 12 of the hand-held power tool 10. Further air inlet openings 11 may exemplarily be arranged at the rear end 14 of the hand-held power tool 10.

Figure 1D:
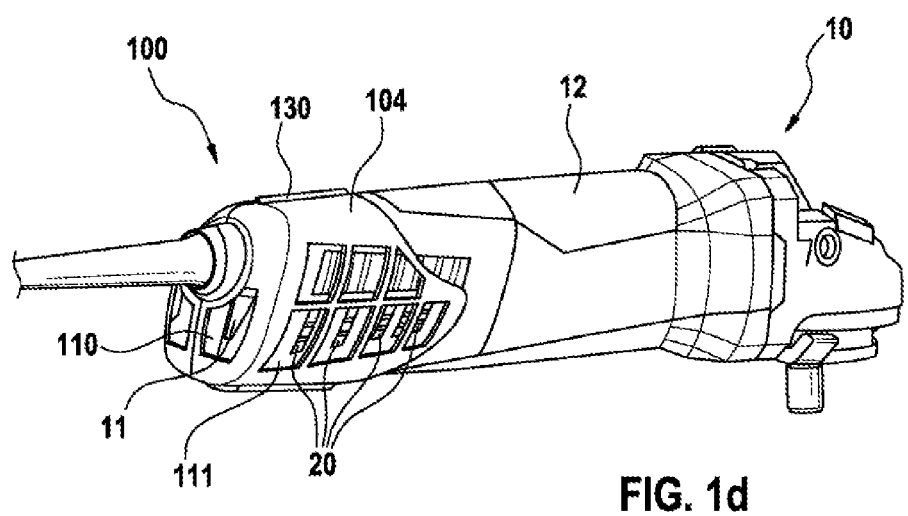
FIG. 1d: Perspective view of a hand-held power tool having a filter carrier in the fastened state.

Shown in FIG. 1d is a perspective view of a hand-held power tool 10, in particular an angle grinder, having a filter carrier 100 in the fastened state. The filter carrier 100 in the fastened state may exemplarily encompass the hand-held power tool 10 in a closely contoured manner.

Figure 1E:
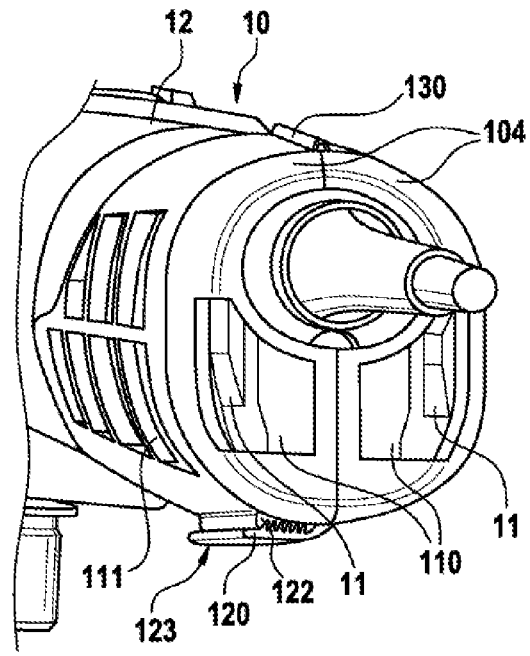
FIG. 1e: Perspective view of the rear end of a hand-held power tool having a filter carrier in the fastened state.

Shown in FIG. 1e is a perspective view of the rear end of a hand-held power tool 10 having a filter carrier 100 in the fastened state. In the fastened state, the film hinge 132 of the filter carrier 100 is exemplarily elastically tensioned in such a manner that the film hinge 132 has a curved shape. Furthermore, the first fastening element 120 of the filter carrier 100 has an actuating element 123 in the form of prominent projection. An actuation of the actuating element 123 of the filter carrier 100 may exemplarily be designed to separate the positive and/or non-positive engagement between the first fastening element 120 and the second fastening element 122 of the filter carrier 100. Advantageously, the filter carrier 100 can easily be separated from the hand-held power tool 10 by an actuation of the actuating element 123.

Alternatively, it is also conceivable to replace the joint 130*b* by a second first fastening element 120 and a second second fastening element 220 of the filter carrier. The two housing half-shells 104, in the non-fastened state, are thereby spaced apart from each other, with the advantageous result that application of the filter carrier 100 to the hand-held power tool 10 is facilitated.

Figure 2:
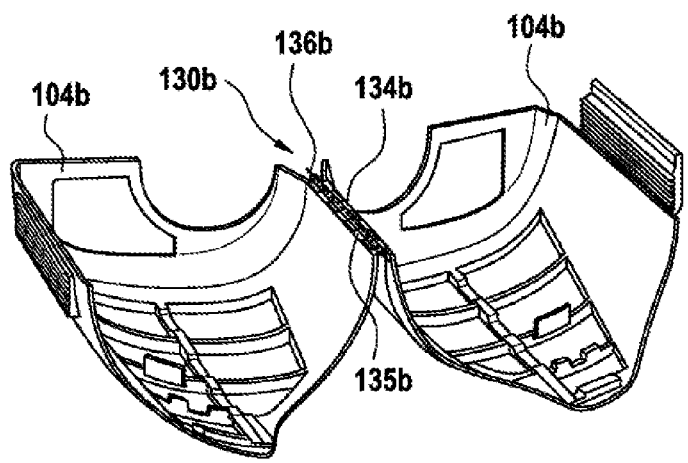
FIG. 2: Perspective view of an alternative embodiment of the filter carrier according to the disclosure.

Shown in FIG. 2 is a perspective view of an alternative embodiment of the filter carrier 100 according to the disclosure. Substantially, this alternative embodiment of the filter carrier 100 differs in the joint 130*b*. The joint 130*b* is realized here as a rotary joint. The filter carrier element 102 is realized here as two pieces, composed of two housing half-shells 104*b*. The housing half-shells 104*b* of the filter carrier 100 have positive-engagement elements 134*b*,136*b* at the end regions to be joined. The positive-engagement elements 134*b*,136*b* of the housing half-shells 104*b* are designed to receive a pin 135*b* with positive engagement. The two housing half-shells 104*b*, when connected to each other, are mounted so as to be rotatable about the pin 135*b*.

Figure 3:
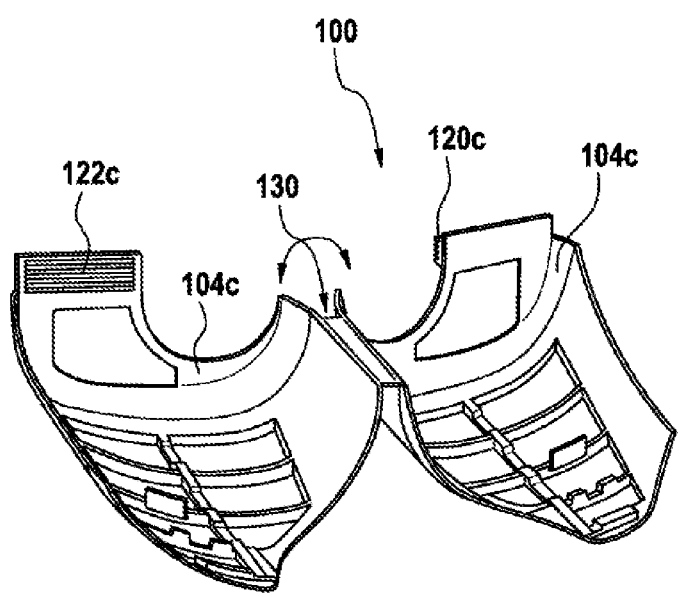
FIG. 3: Perspective view of a third embodiment of a filter carrier according to the disclosure.

Shown in FIG. 3 is a perspective view of a third embodiment of a filter carrier 100 according to the disclosure. In this embodiment, the filter-carrier housing half-shells 104c only partly encompass the outer circumferential surface 13 of the hand-held power tool 10 in the longitudinal direction. In this embodiment, the first and the second fastening element 120c,122c of the filter carrier 100 are arranged transversely in relation to the longitudinal alignment of the filter carrier 100, in particular on the filter carrier element 102, that is assigned to the rear end of the hand-held power tool 10.

Figure 4A:
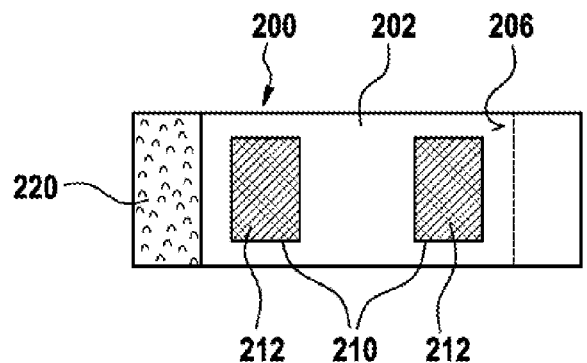
FIG. 4a: Top view of a fourth embodiment of a filter carrier.
Figure 4B:
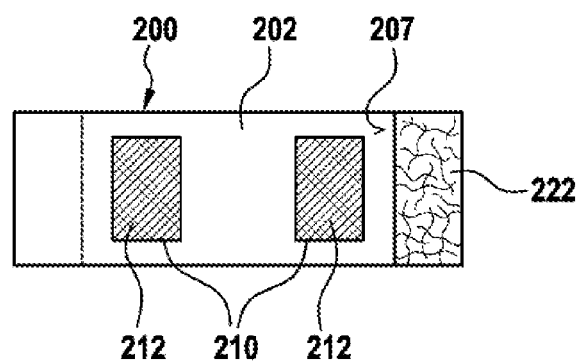
FIG. 4b: Bottom view of a fourth embodiment of a filter carrier.
Figure 4C:
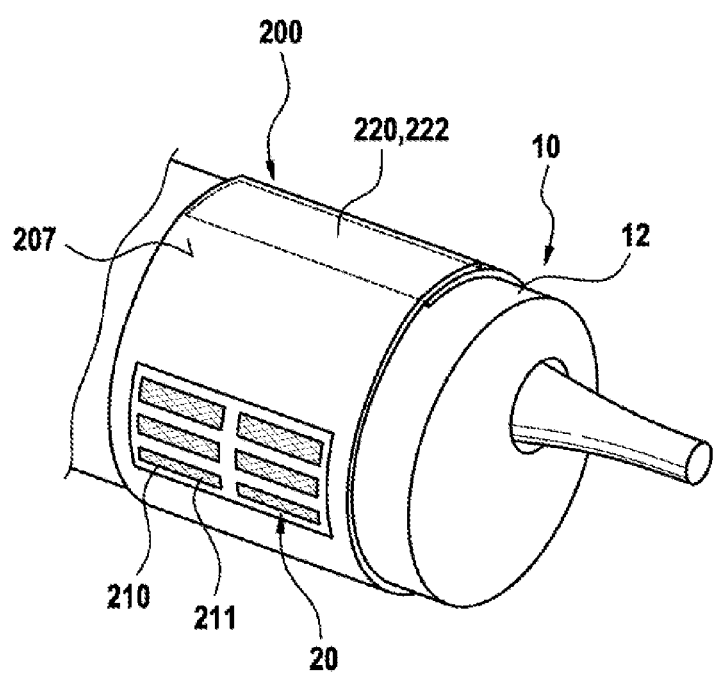
FIG. 4c: Perspective view of a hand-held power tool having a fourth embodiment of a filter carrier in the fastened state.

Shown in FIG. 4a is a top view of a fourth embodiment of a filter carrier 200, in FIG. 4b a bottom view of a fourth embodiment of the filter carrier 200, and in FIG. 4c a perspective view of a hand-held power tool 10 having a fourth embodiment of the filter carrier 200 in the fastened state. The filter carrier element 202 of the filter carrier 200 may advantageously be made of a high-flexibility material, in particular a woven fabric, a cloth or an elastic plastic such as TPE. The filter carrier 200 has receiving opening 210, which are designed to receive filter elements 212. The filter carrier 200 has a first fastening element 220 and a second fastening element 222, which are realized such that they can be separably connected to each other. The connection of the two fastening elements 220,222 of the filter carrier 200 to each other may exemplarily be effected by means of a hook-and-loop connection. For this purpose, the first fastening element 220 of the filter carrier is realized as a catching element, in particular a hook element, and the second fastening element of the filter carrier 200 is realized as a corresponding catching element, in particular as a loop element. The first and the second fastening element 220,222 of the filter carrier 200 may advantageously be arranged close to opposite end regions, in particular lateral edges and on opposite lateral surfaces of the filter carrier. In particular, the first fastening element 220 of the filter carrier 200 is arranged on the inner lateral surface 106, the inner lateral surface 206 impinging on the hand-held power tool in the fastened state. The second fastening element 222 of the filter carrier 200 may advantageously be arranged on the outer lateral surface 207 of the filter carrier 200. The filter carrier 200 is realized so as to be elastic, in such a manner that, in the non-fastened state, it is realized so as to be substantially flat and stackable (see FIG. 4a) and, in the fastened state, is realized so as to encompass a circumferential surface of a hand-held power tool 10 (see FIG. 4c). In particular, the filter carrier 200 may be realized in the form of a band or envelope.

Figure 5:
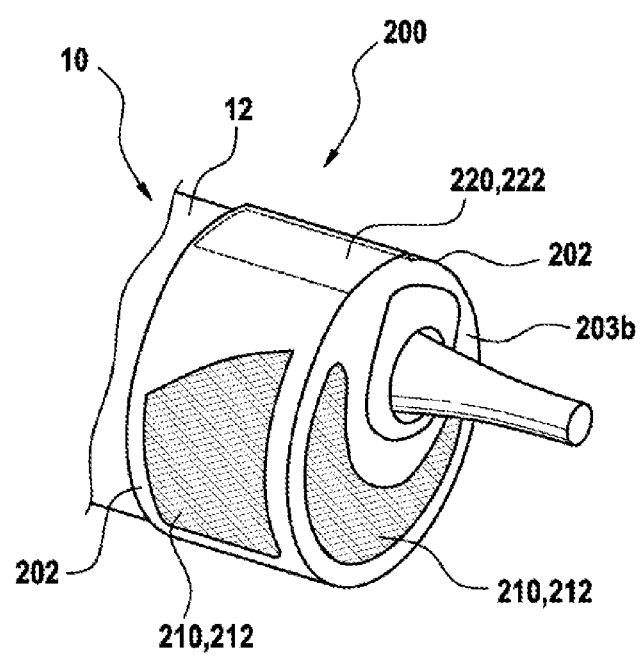
FIG. 5: Perspective view of a hand-held power tool having a fifth embodiment of a filter carrier in the fastened state.

Shown in FIG. 5 is a perspective view of a hand-held power tool 10 having a fifth embodiment of a filter carrier 200 in the fastened state. Substantially, this embodiment differs from the preceding embodiment of the filter carrier 200 in an additional filter carrier element 203b which, in the fastened state, is advantageously arranged at the rear end of the hand-held power tool 10. The additional filter carrier element 203b is realized such that it can be connected to the filter carrier element 202. Furthermore, the additional filter carrier element 203b comprises receiving openings 211 for filter elements 212, which are designed to cover air inlet openings at the rear end of the hand-held power tool 10. In particular, the filter carrier 200 may also be realized as a shell.

Figure 6:
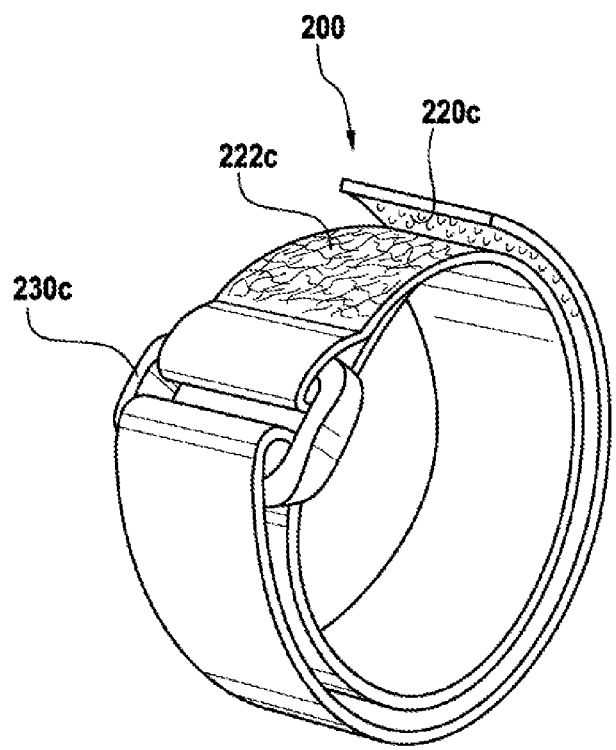
FIG. 6: Perspective view of a sixth embodiment of a filter carrier.

FIG. 6: Perspective view of a sixth embodiment of a filter carrier 200. Exemplarily, arranged at the end region of the filter carrier 200, at which the second fastening element 222 of the filter carrier 200 is arranged, is a ring-type fastening element 230c, in particular a buckle element. The opposite end region of the filter carrier 200c, at which the first fastening element 220c of the filter carrier 200c is arranged, can be threaded through the ring-type fastening element 230c. In particular, in this embodiment, the first fastening element 220c of the filter carrier 200 is arranged on the same lateral surface as the second fastening element 222c of the filter carrier.

Figure 7A:
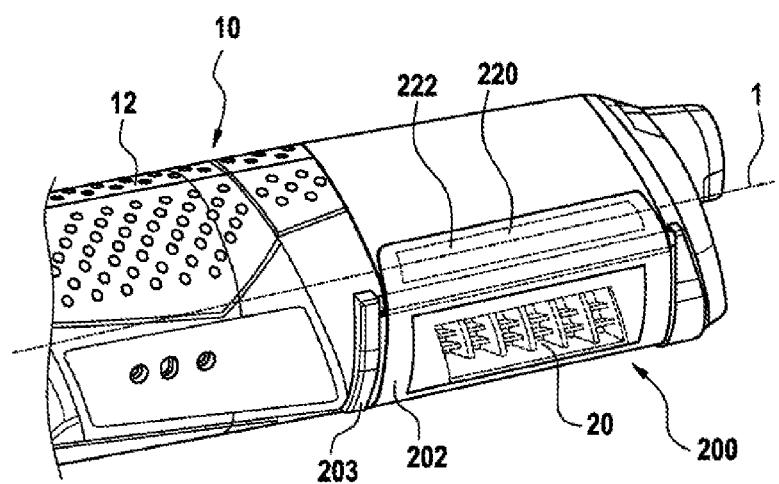
FIG. 7a: Perspective view of a further embodiment of the filter carrier according to FIG. 7 in the fastened state.

Shown in FIG. 7 is a perspective view of a further embodiment of a filter carrier 200, and in FIG. 7a when having been fastened to the hand-held power tool 10. The filter carrier 200 comprises a high-flexibility filter carrier element 202 that is realized substantially as the filter carrier element in the exemplary embodiment according to FIG. 4a and FIG. 4b. For additional securing of the filter carrier 200 on the hand-held power tool 10, the filter carrier 200 has a second filter carrier element 203, on which additional positive-engagement elements 240 are arranged. The second filter carrier element 203 is exemplarily made of a dimensionally stable material such as a low-flexibility plastic. The second filter carrier element 203 is connected to the filter carrier element 203 via a web 242, exemplarily realized on the second filter carrier element 203. A face end of the first filter carrier element 202 wraps around the web 242 of the second filter carrier element 203, and may be permanently, in particular rotatably, fastened to the second filter carrier element 203, for example by sewing. The seam 244 is indicated by broken lines in FIG. 7.

On a side that, in the fastened state, faces toward the hand-held power tool 10, the second filter carrier element 203 has four additional positive-engagement elements 240, which are realized, in particular, so as to be integral with the second filter carrier element 203. The additional positive-engagement elements 240 may be realized, for example, as lugs or webs. The additional positive-engagement elements 240 engage in corresponding securing elements (not represented) in the form of pockets or recesses arranged on the housing 12 of the hand-held power tool 10, in such a manner that the second filter carrier element 203 is secured against axial rotation or axial displacement. Alternatively, it is also conceivable that the additional positive-engagement elements 240 can engage in air inlet openings 20 of the hand-held power tool 10 and can thereby be fastened (not represented). It is likewise conceivable that the housing 12 of the hand-held power tool 10 has securing elements in the form of lugs or webs, and the second filter carrier element 203 of the filter carrier 200 has corresponding pockets for receiving.

An axial displacement is to be understood to mean, in particular, a displacement of the filter carrier 200 along the longitudinal axis 1 of the hand-held power tool 10. For the purpose of fastening the filter carrier 200 to the hand-held power tool 10, the second filter carrier element 203 is firstly connected to the hand-held power tool 10, in particular by being placed on, and then the filter carrier element 202 is looped around the housing 12 of the hand-held power tool 10 and closed by means of the fastening elements 220,222, in particular the hook-and-loop elements. Advantageously, the filter carrier 200 is securely fastened at an intended position by the second filter carrier element 203.

If the second filter carrier element 203, in the fastened state, is arranged over air inlet openings 20 of the hand-held power tool 10, the second filter carrier element 203 advantageously has at least one recess 246 of at least the size of the air inlet openings 20. Particularly advantageously, the filter element 212 of the first filter carrier element 202, in the fastened state, is arranged over the recess 246 of the second filter carrier element 203 in such a manner that an air flow, entering the housing 12 of the hand-held power tool 10 via the inlet openings 20, passes firstly through the filter element 212 and then the recess 246 in the direction of flow.

The invention claimed is:

1. A filter carrier for a hand-held power tool, comprising:
at least one filter carrier element including at least one receiving opening configured to receive at least one filter element;
at least one first fastening element and at least one second fastening element configured to separably fasten the filter carrier to the hand-held power tool; and
at least one securing element arranged in a region of the at least one receiving opening,
wherein the at least one first fastening element and the at least one second fastening element are arranged at opposite end regions of the filter carrier in an unfastened state, and the at least one first fastening element is configured to be connected to the at least one second fastening element in a fastened state.

2. The filter carrier as claimed in claim 1, wherein, in the fastened state, the filter carrier is configured to encompass a circumferential surface of the hand-held power tool at least partially in a longitudinal direction, and to encompass the circumferential surface of the hand-held power tool at least partially in a circumferential direction.

3. The filter carrier as claimed in claim 1, wherein the at least one first fastening element and the at least one second fastening element are arranged substantially along or transversely in relation to a longitudinal direction of the filter carrier.

4. The filter carrier as claimed in claim 1, further comprising:
a second filter carrier element arranged at an angle of 45° to 90° relative to a longitudinal alignment of the hand-held power tool.

5. The filter carrier as claimed in claim 1, wherein the at least one filter carrier element includes a low-flexibility material.

6. The filter carrier as claimed in claim 1, wherein the at least one filter carrier element includes two filter carrier elements configured as filter-carrier half-shells.

7. The filter carrier as claimed in claim 6, wherein the two filter-carrier half-shells are configured to be separably connected to each other via two of the at least one first fastening element and two of the at least one second fastening element.

8. The filter carrier as claimed in claim 6, further comprising:
a joint arranged between the two filter-carrier half-shells.

9. The filter carrier as claimed in claim 1, wherein the at least one first fastening element and the at least one second fastening element are configured as mutually corresponding latching elements.

10. The filter carrier as claimed in claim 1, wherein the at least one securing element is configured to provide axial and/or rotational securing of the filter carrier on the hand-held power tool.

11. The filter carrier as claimed in claim 1, wherein the at least one filter carrier element includes a high-flexibility material.

12. The filter carrier as claimed in claim 11, wherein the at least one first fastening element and the at least one second fastening element are arranged on opposite lateral surfaces of the filter carrier.

13. The filter carrier as claimed in claim 11, wherein the at least one first fastening element and the at least one second fastening element include mutually corresponding hook-and-loop closure elements.

14. The filter carrier as claimed in claim 11, wherein:
the at least one first fastening element is a first lateral surface of the at least one filter carrier element, and
the at least one second fastening element is a second lateral surface of the at least one filter carrier element.

15. The filter carrier as claimed in claim 11, further comprising:
an additional positive-engagement element configured to prevent an axial displacement of the filter carrier along a longitudinal axis of the hand-held power tool and/or twisting of the filter carrier about the longitudinal axis of the hand-held power tool.

16. The filter carrier as claimed in claim 15, further comprising:
a second filter carrier element,
wherein the at least one additional positive-engagement element is arranged on the second filter carrier element.

17. The filter carrier as claimed in claim 16, wherein the second filter carrier element is connected to the at least one filter carrier element via a web.

18. A system comprising:
a hand-held power tool; and
a filter carrier including:
at least one filter carrier element including at least one receiving opening configured to receive at least one filter element;
at least one first fastening element and at least one second fastening element configured to separably fasten the filter carrier to the hand-held power tool; and
at least one securing element arranged in a region of the at least one receiving opening,
wherein the at least one first fastening element and the at least one second fastening element are arranged at opposite end regions of the filter carrier in an unfastened state, and the at least one first fastening element is configured to be connected to the at least one second fastening element in a fastened state.

19. The filter carrier as claimed in claim 2, wherein the filter carrier is configured to completely encompass the circumferential surface of the hand-held power tool in the circumferential direction.

20. The filter carrier as claimed in claim 8, wherein the joint is a hinge joint or a rotary joint.

* * * * *